(12) United States Patent
Nalis et al.

(10) Patent No.: US 9,111,037 B1
(45) Date of Patent: Aug. 18, 2015

(54) METHOD AND APPARATUS TO ENABLE MAINFRAME COMPUTER TESTING FOR SOFTWARE TESTING MANAGEMENT PLATFORM

(71) Applicant: CA, Inc., Islandia, NY (US)

(72) Inventors: Srdjan Nalis, Prague (CZ); Philippe Dubost, Prague (CZ)

(73) Assignee: CA, Inc., Islandia, NY (US)

( * ) Notice: Subject to any disclaimer, the term of this patent is extended or adjusted under 35 U.S.C. 154(b) by 29 days.

(21) Appl. No.: 13/972,462

(22) Filed: Aug. 21, 2013

(51) Int. Cl.
*G06F 9/44* (2006.01)
*G06F 11/36* (2006.01)

(52) U.S. Cl.
CPC .......... *G06F 11/3664* (2013.01); *G06F 11/368* (2013.01); *G06F 11/3668* (2013.01); *G06F 11/3672* (2013.01)

(58) Field of Classification Search
CPC ............ G06F 11/3664; G06F 11/3668; G06F 11/3672; G06F 11/368
See application file for complete search history.

(56) References Cited

U.S. PATENT DOCUMENTS

| | | | |
|---|---|---|---|
| 5,511,185 A | 4/1996 | Weinbaum et al. | |
| 5,657,438 A | 8/1997 | Wygodny et al. | |
| 5,701,139 A | 12/1997 | Weinbaum et al. | |
| 5,870,559 A | 2/1999 | Leshem et al. | |
| 5,958,008 A | 9/1999 | Pogrebisky et al. | |
| 5,974,572 A | 10/1999 | Weinberg et al. | |
| 6,144,962 A | 11/2000 | Weinberg et al. | |
| 6,205,122 B1 | 3/2001 | Sharon et al. | |
| 6,237,006 B1 | 5/2001 | Weinberg et al. | |
| 6,341,310 B1 | 1/2002 | Leshem et al. | |
| 6,360,332 B1 | 3/2002 | Weinberg et al. | |
| 6,430,708 B1 * | 8/2002 | Evans | 714/38.14 |
| 6,449,739 B1 | 9/2002 | Landan | |
| 6,470,383 B1 | 10/2002 | Leshem et al. | |
| 6,477,483 B1 | 11/2002 | Scarlat et al. | |
| 6,549,944 B1 | 4/2003 | Weinberg et al. | |
| 6,560,564 B2 | 5/2003 | Scarlat et al. | |
| 6,587,969 B1 | 7/2003 | Weinberg et al. | |
| 6,694,288 B2 | 2/2004 | Smocha et al. | |
| 6,738,813 B1 | 5/2004 | Reichman | |
| 6,738,933 B2 | 5/2004 | Fraenkel et al. | |
| 6,754,701 B1 | 6/2004 | Kessner | |

(Continued)

OTHER PUBLICATIONS

Kotik, Gordon B., et al., "Automating Software Analysis and Testing Using a Program Transformation System", 1989, pp. 75-84.*

(Continued)

*Primary Examiner* — Thuy Dao
*Assistant Examiner* — Christopher Franco
(74) *Attorney, Agent, or Firm* — Coats & Bennett, P.L.L.C.

(57) ABSTRACT

A computer-implemented method is disclosed in which locations of a plurality of Job Control Language (JCL) tests are obtained from a primary database supporting a software testing management platform. The locations the locations of the plurality of JCL tests are transmitted to a mainframe computing system (MCS) to initiate execution of the JCL tests. Based on transmitting the JCL test locations, execution IDs are retrieved for each of the plurality of JCL tests from the MCS. For each JCL test, the execution ID and an initial status of the JCL test are stored in the primary database. A query is transmitted to the MCS to determine an execution status of a given one of the JCL tests. Based on transmitting the query, a status update is received from the MCS for the JCL test, and the initial status of the JCL test in the primary database is selectively updated.

18 Claims, 10 Drawing Sheets

(56) References Cited

U.S. PATENT DOCUMENTS

| | | | |
|---|---|---|---|
| 6,792,460 | B2 | 9/2004 | Oulu et al. |
| 6,810,494 | B2 | 10/2004 | Weinberg et al. |
| 6,898,556 | B2 | 5/2005 | Smocha et al. |
| 6,973,489 | B1 | 12/2005 | Levy |
| 7,197,559 | B2 | 3/2007 | Goldstein et al. |
| 7,480,898 | B2 * | 1/2009 | Batten et al. ............ 717/124 |
| 8,826,239 | B2 * | 9/2014 | Sawano ................. 717/126 |
| 2005/0283667 | A1 * | 12/2005 | Batten et al. ............ 714/25 |
| 2008/0172579 | A1 * | 7/2008 | Hahm et al. ............ 714/37 |
| 2008/0288920 | A1 * | 11/2008 | Takai ..................... 717/114 |
| 2009/0271764 | A1 * | 10/2009 | Gonzales, II ........... 717/115 |
| 2010/0064281 | A1 * | 3/2010 | Kimball et al. ......... 717/124 |
| 2010/0218168 | A1 * | 8/2010 | Gonzales, II ........... 717/124 |
| 2010/0251024 | A1 * | 9/2010 | Gonzales, II ........... 714/32 |
| 2010/0251246 | A1 * | 9/2010 | Gonzales, II ........... 718/102 |
| 2012/0198421 | A1 * | 8/2012 | Arumugham et al. ... 717/125 |
| 2012/0324427 | A1 * | 12/2012 | Provost et al. .......... 717/126 |
| 2014/0258985 | A1 * | 9/2014 | Yawn et al. ............. 717/125 |

OTHER PUBLICATIONS

Sibley, Edgar H., "The software configuration management database", 1981, pp. 249-255.*

Park, Heesun, "Test Automation for Multi-Platform Client/Server Software", 2012, pp. 1-8.*

Hermans, John, et al., "A Software Testing Approach Supported by a Tool Environment for the Development of Component Tests", 2006, pp. 1-57.*

Naslaysky, Leila, et al., "Towards Traceability of Model-based Testing Artifacts", 2007, pp. 105-114.*

Pun, Kai, et al., "Automatic Test Generation for Mutation Testing on Database Applications", 2013, pp. 111-117.*

IBM, "MF-Test 3.5", Oct. 23, 2012; pp. 1-5; Retrieved on Aug. 21, 2013, Retrieved from: http://www-304.ibm.com/partnerworld/gsd/solutiondetails.do?solution+47952&expand=trure&lc=en.

Ascert, "VersaTest Automation Server Plugin for Quality Center Software", Retrieved on Aug. 21, 2013; Retrieved from http://www.stantonsys.com/test.html; versatest_quality_center_plug-in.pdf; pp. 1-2; 0908-1 EN-US SAU-L.

IBM, "What is JES?", Retrieved on Aug. 21, 2013; Retrieved from: publib.boulder.ibm/infocenter/zos/basics/index.jsp?topic=/com.ibm.zos.zconcepts/zconc_whatisjes.htm; Jul. 6, 2013; pp. 1-3.

Dyck, Lionel B., "Submitting Jobs and Retrieving the Output Via FTP", pp. 1-3, Technical Support, May 1, 1998, Technical Enterprises, Inc.

Most Technologies, "Installation Summary & Requirements", MF-Test Installation Summary, 2012, pp. 1-5, Most Software Technologies, Inc.; Retrieved on Aug. 21, 2013; Retrieved from: http://www-304.ibm.com/partnerworld/gsd/showimage.do?id=34555.

Most Technologies, "MF-Test", 2012, pp. 1-2, Retrieved on Aug. 21, 2013; Retrieved from: http://www.google.com/url?sa=t&rct=j&q=&esrc=s&frm=1&source=web&cd=4&ved=0CDwQFjAD&url=http%3A%2F%2Fwww-304.ibm.com%2Fpartnerworld%2Fgsd%2Fshowimage.do%3Fid%3D3455-4&ei=WAIVUr36MuGyyAGfv1CQCQ&usg=AFQjCNHTxwOlwovKPmgoH67cnnaGct6AXA&sig2=D4e1IT8_klSs5EBbZ9q4xg.

\* cited by examiner

METHOD AND APPARATUS TO ENABLE MAINFRAME COMPUTER TESTING FOR SOFTWARE TESTING MANAGEMENT PLATFORM

TECHNICAL FIELD

The present disclosure relates to software testing for mainframe computing systems, and more specifically relates to supporting such testing in a software testing management platform.

BACKGROUND

Quality Center (now known as Application Lifecycle Management, and referred to herein as "QC/ALM") is a popular web-based software testing management platform from HEWLETT-PACKARD that helps manage information about application releases, testing cycles, requirements, test automation, and software defects from a central repository (a "primary database" herein). In particular, QC/ALM provides software testing functionality, including large scale batch testing, so that quality assurance (QA) engineers can define a number of test cases, and then have those tests run in an automated fashion. The QA engineers, or other users, can then login to QC/QLM to obtain status updates and detailed reporting of test results.

Job Control Language (JCL) is a scripting language used to define tests for mainframe computing systems. Quality Center does not natively support JCL tests, or any other tests for mainframe computing systems. This has caused QA engineers who handle such tests to utilize a manual testing process that does not utilize QC, in which a QA engineer manually submits his JCL tests to a mainframe computing system, waits until the jobs are processed, and then manually summarizes the results of those tests in a tabular or graphical form for QA management.

SUMMARY

According to one aspect of the present disclosure, a computer-implemented method comprises obtaining locations of a plurality of Job Control Language (JCL) tests from a database of a software testing management platform, wherein the database is a primary database that supports operation of the software testing management platform. The locations the locations of the plurality of JCL tests are transmitted to a mainframe computing system to initiate execution of the plurality of JCL tests in the mainframe computing system. Based on transmitting the JCL test locations, execution identifiers (IDs) are retrieved for each of the plurality of JCL tests from the mainframe computing system. For each JCL test, the execution ID and an initial status of the JCL test are stored in the primary database. A query is subsequently transmitted to the mainframe computing system to determine an execution status of a given one of the plurality of JCL tests. Based on transmitting the query, a status update is received from the mainframe computing system for the given JCL test. Based on the status update, the initial status of the given JCL test in the primary database is selectively updated.

According to another aspect of the present disclosure, a computing device comprises a communication interface and a controller. The communication interface is configured to send and receive data between the computing device and a mainframe computing system, and between the computing device and a primary database that supports operation of a software testing management platform. The controller is configured to obtain locations of a plurality of Job Control Language (JCL) tests from the primary database, and transmit the locations of the plurality of JCL tests to the mainframe computing system to initiate execution of the plurality of JCL tests in the mainframe computing system. The controller is further configured to, based on transmitting the JCL test locations, retrieve execution identifiers (IDs) for each of the plurality of JCL tests from the mainframe computing system. The controller is further configured to store, in the primary database and for each JCL test, the execution ID and an initial status of the JCL test. The controller is further configured to subsequently transmit a query to the mainframe computing system to determine an execution status of a given one of the plurality of JCL tests, and based on transmitting the query, receive a status update from the mainframe computing system for the given JCL test. The controller is further configured to, based on the status update, selectively update the initial status of the given JCL test in the primary database.

According to another aspect of the present disclosure, a computer program product comprises a computer readable storage medium having computer readable program code embodied therewith, the computer readable program code comprising computer readable program code configured to obtain locations of a plurality of Job Control Language (JCL) tests from a database of a software testing management platform, wherein the database is a primary database that supports operation of the software testing management platform. The computer readable program code further comprises computer readable program code configured to transmit the locations of the plurality of JCL tests to a mainframe computing system to initiate execution of the plurality of JCL tests in the mainframe computing system. The computer readable program code further comprises computer readable program code configured to, based on transmitting the JCL test locations, retrieve execution identifiers (IDs) for each of the plurality of JCL tests from the mainframe computing system. The computer readable program code further comprises computer readable program code configured to store, in the primary database and for each JCL test, the execution ID and an initial status of the JCL test. The computer readable program code further comprises computer readable program code configured to subsequently transmit a query to the mainframe computing system to determine an execution status of a given one of the plurality of JCL tests, and based on transmitting the query, receive a status update from the mainframe computing system for the given JCL test. The computer readable program code further comprises computer readable program code configured to, based on the status update, selectively update the initial status of the given JCL test in the primary database.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
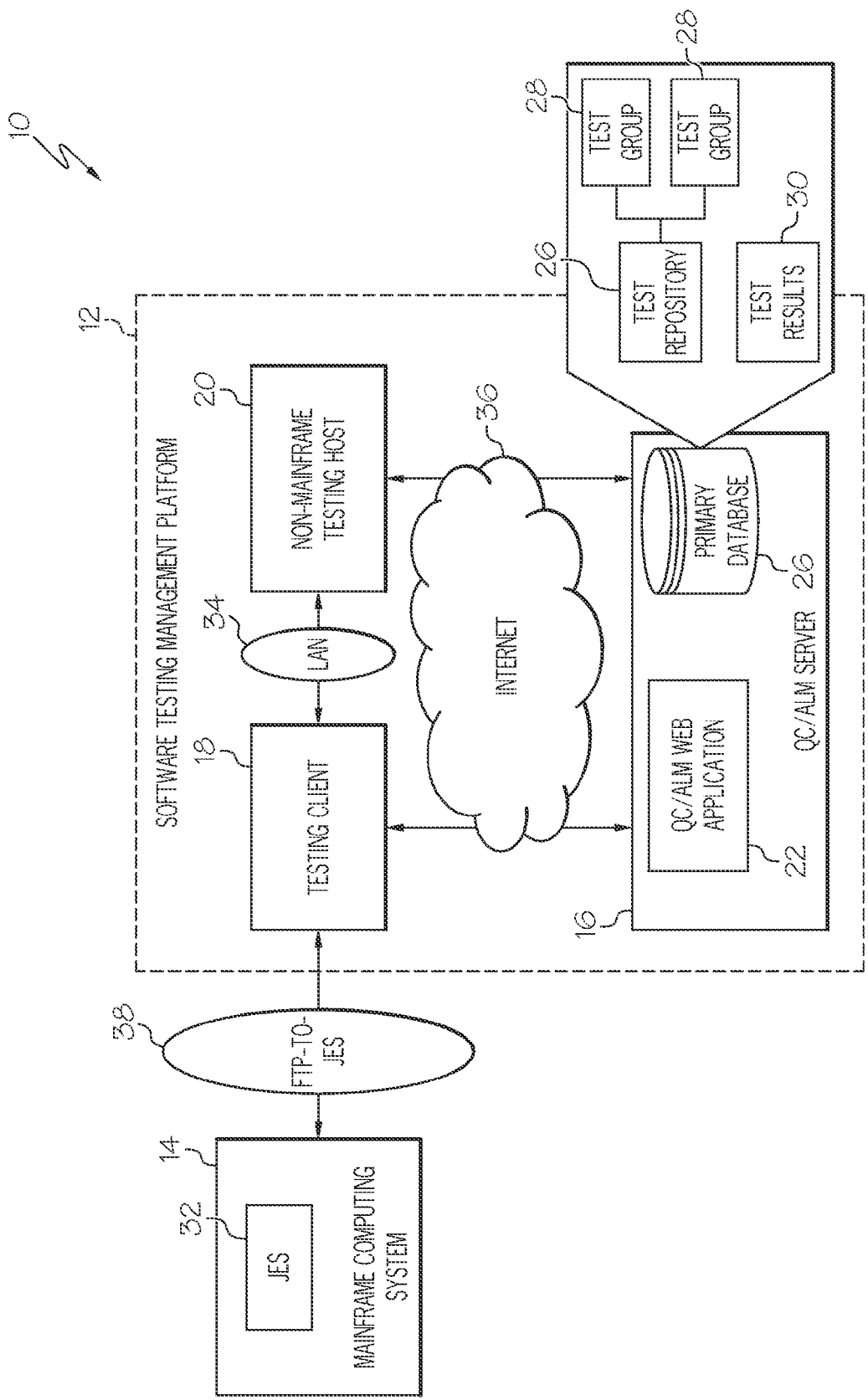
FIG. 1 illustrates a network in which QC/ALM is extended to support testing of JCL tests on a mainframe computing system.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure describes a method, apparatus, and computer-program product for supporting JCL testing in a software testing management platform (e.g., a platform such as QC/ALM that does not natively support testing of JCL tests). As described in more detail below, the locations of a plurality of Job Control Language (JCL) tests are obtained, and are transmitted to a mainframe computing system. Data relating to an execution identifier (ID), and execution status for each of the plurality of tests is stored in a primary database of the software testing management platform. As the tests complete in the mainframe computing system, test results are stored directly in the primary database of the software testing management platform.

Referring now to FIG. 1, a network 10 is illustrated in which a software testing management platform 12 is extended to support testing of JCL tests on a mainframe computing system 14. The software testing management platform 12 does not natively support testing of JCL tests. In the example of FIG. 1, the software testing management platform 12 is a QC/ALM platform that includes a QC/ALM server 16, a testing client 18, and a non-mainframe testing host 20 (e.g., a computer running MICROSOFT WINDOWS). The server 16 includes a web application 22 in which execution of tests can be configured, and test results can be viewed. The server 16 also includes a primary database 24 that supports operation of the platform 12. In addition to storing the test execution data, and test results, the primary database 24 includes a test repository 26 including data for a plurality of tests to be executed on host 20 (e.g., the actual tests themselves and/or locations of the tests). A plurality of test groups 28 are formed from the larger test repository 26. In one or more embodiments the test repository 26 is a "QC Test Plan" within QC/ALM, and each test group 28 is a "QC Test Lab" within QC/ALM. In one or more embodiments, some or all of the test groups 28 form subsets of tests that include some but not all of the tests in the test repository 26.

The QC/ALM server 16, testing client 18, and non-mainframe testing host 20 communicate with each other through one or more of a local area network (LAN) 34 and a wide area network (WAN), such as the Internet 36. The testing client 18 and non-mainframe testing QC/ALM natively supports execution of non-JCL tests on a non-mainframe testing host 20, and such features are understood by those of ordinary skill in the art. Therefore, use of the non-mainframe testing host 20 to execute non-JCL tests will not be discussed in detail below.

The testing client 18 is operative to communicate with the QC/ALM server 16 and the mainframe computing system 14 to extend the functionality of the software testing management platform 12 to support execution of JCL tests on the mainframe computing system 14. In one or more embodiments, the testing client 18 uses a File Transfer Protocol-to-Job Entry Subsystem (FTP-to-JES) protocol 38 to communicate with a Job Entry Subsystem (JES) spool 32 on the mainframe computing system (with "FTP" referring to File Transfer Protocol, and "JES" referring to Job Entry System). JES is a job processing unit of a mainframe operating system, and is used for executing JCL tests.

Figure 2:
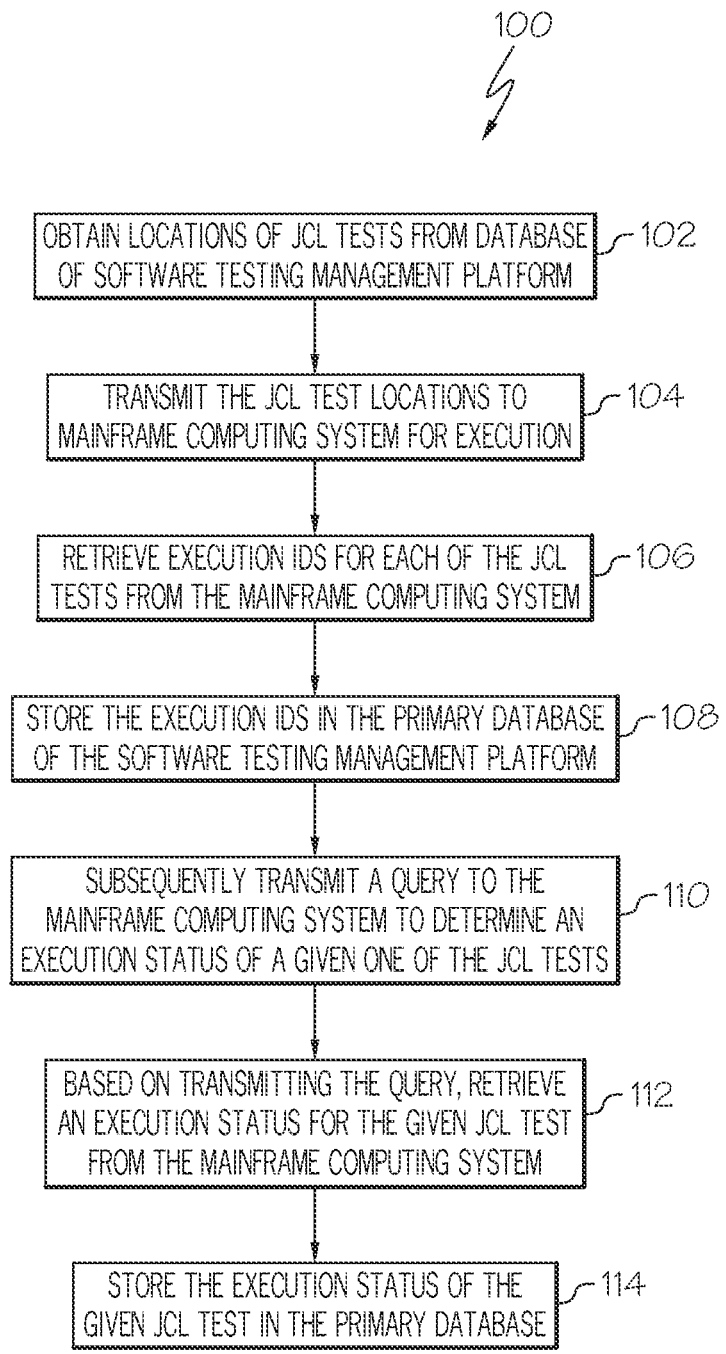
FIG. 2 illustrates an example computer-implemented method of integrating testing of JCL tests into a software testing management platform.

FIG. 2 illustrates an example computer-implemented method 100 of integrating testing of JCL tests into the software testing management platform 12 (e.g., QC/ALM). Locations of a plurality of Job Control Language (JCL) tests are obtained from a database of a software testing management platform 12 (e.g., QC/ALM), wherein the database is the primary database 24 that supports operation of the software testing management platform 12 (block 102). The locations of the plurality of JCL tests are transmitted to mainframe computing system 14 to initiate execution of the plurality of JCL tests in the mainframe computing system 14 (block 104). Based on transmitting the JCL test locations, execution identifiers (IDs) for each of the plurality of JCL tests are retrieved from the mainframe computing system 14 (block 106). The execution ID and an initial status of the JCL test are stored in the primary database 24 for each JCL test (block 108). Subsequently, a query is transmitted to the mainframe computing system 14 to determine an execution status of a given one of the plurality of JCL tests (block 110). Based on transmitting the query, a status update is received from the mainframe computing system 14 for the given JCL test (block 112), and based on that status update the initial status of the JCL test is selectively updated in the primary database 24 (block 114). The update of block 114 is "selective" because in some instances the status update may indicate that the JCL test is not yet completed, and so the "initial status" has not yet changed and there is no update to store in the primary database 26.

Figure 3:
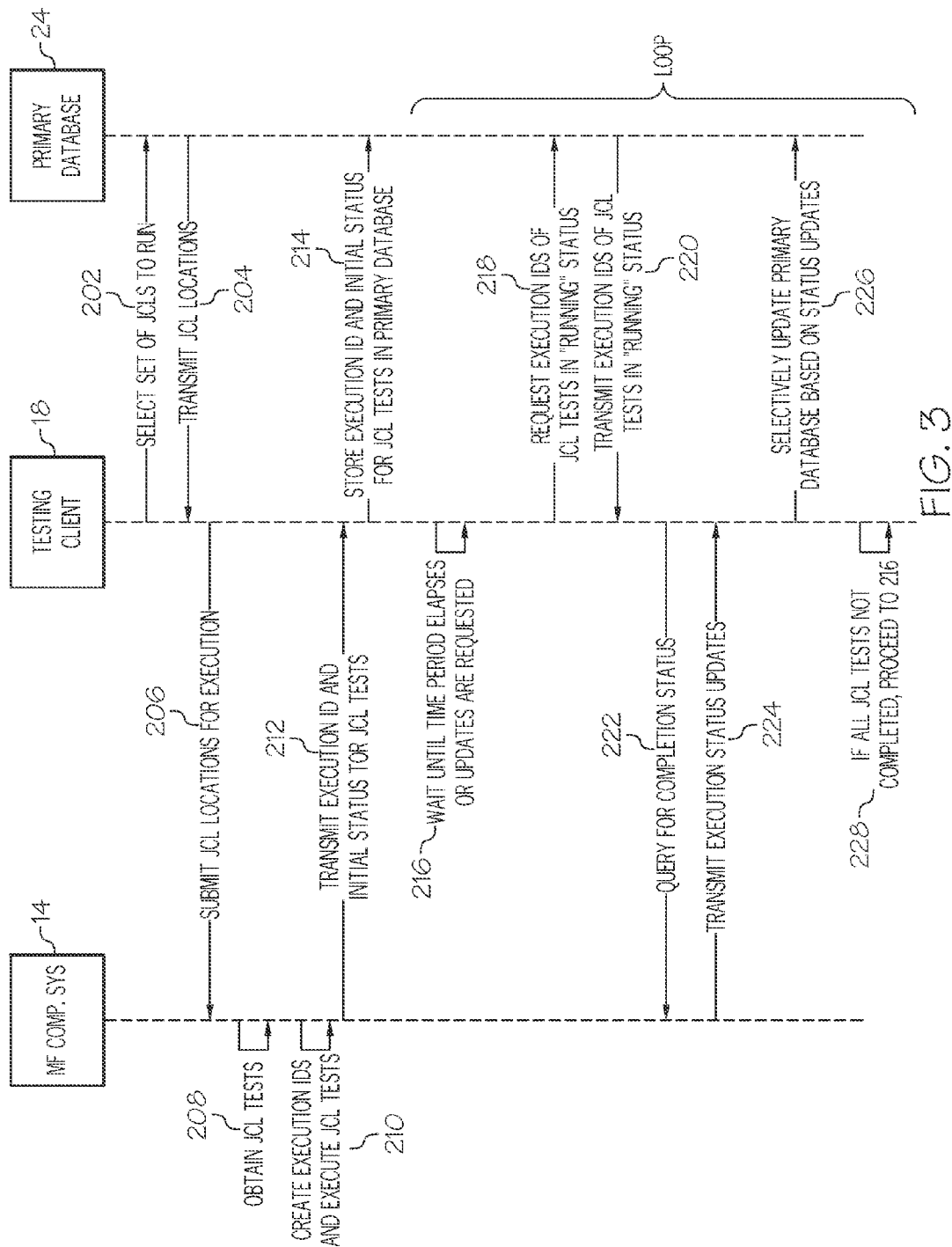
FIG. 3 is a call flow diagram illustrating an example implementation of the method of FIG. 2.
Figure 4:
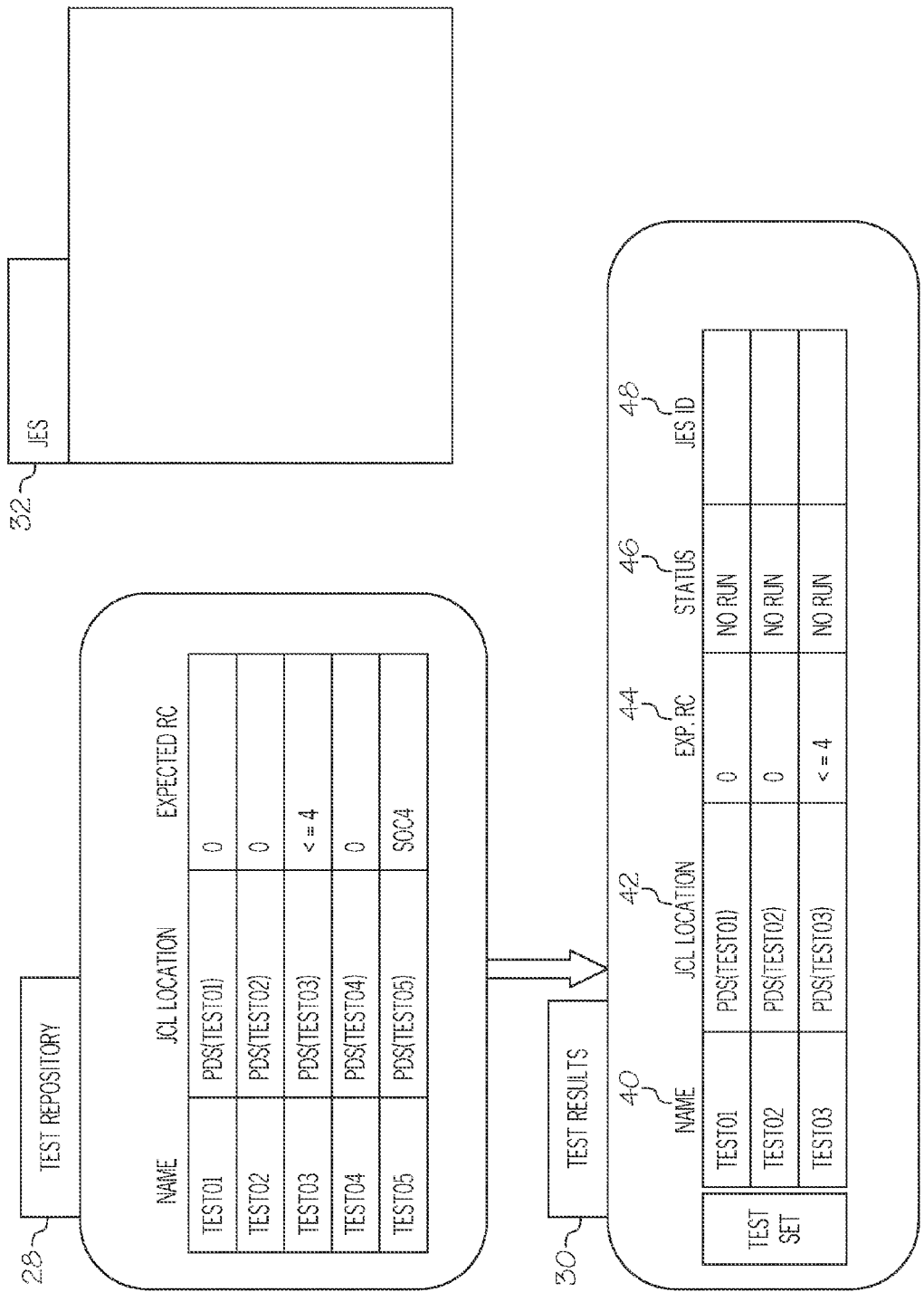
FIGS. 4-9 illustrate example data processing operations for the method of FIG. 2.

FIG. 3 is a call flow diagram 200 illustrating an example implementation of the method 100. The testing client 18 selects a plurality of JCL tests, each of which is part of a test group 28 within the larger test repository 26, that it wishes to run on the mainframe computing system 14, and sends a request for the locations of the plurality of tests to the primary database 24 (step 202). Based on that request, the testing client 18 receives the locations of the plurality of JCL tests from the primary database 24 (step 204). In connection with step 204, records for the test results 30 are created in the primary database 24, which include a test name 40 (e.g., "TEST01"), a JCL location 42 for the test, an expected return code 44, a test status 46, and a JES ID 48 for the test (see FIG. 4).

The testing client 18 submits the locations of the plurality of JCL tests to the mainframe computing system 14 to initiate execution of those JCL tests (step 206), and the JES spool 32 uses those locations to obtain the JCL tests (step 208). In one or more embodiments, the JCL tests are stored in the mainframe computing system 14, and the JES spool 32 obtains the test from within the mainframe computing system 14. In one or more other embodiments, the JCL tests are stored in the test repository 26 (or some other location), and the mainframe computing system 14 uses a protocol such as FTP to obtain the JCL tests from the test repository 26 (or other location). The JES spool 32 creates execution IDs for the plurality of JCL tests and begins executing them (step 210). The testing client then retrieves the JCL execution ID and an initial status for each JCL test (step 212), and stores the execution IDs and initial statuses in the primary database (step 214).

Figure 5:
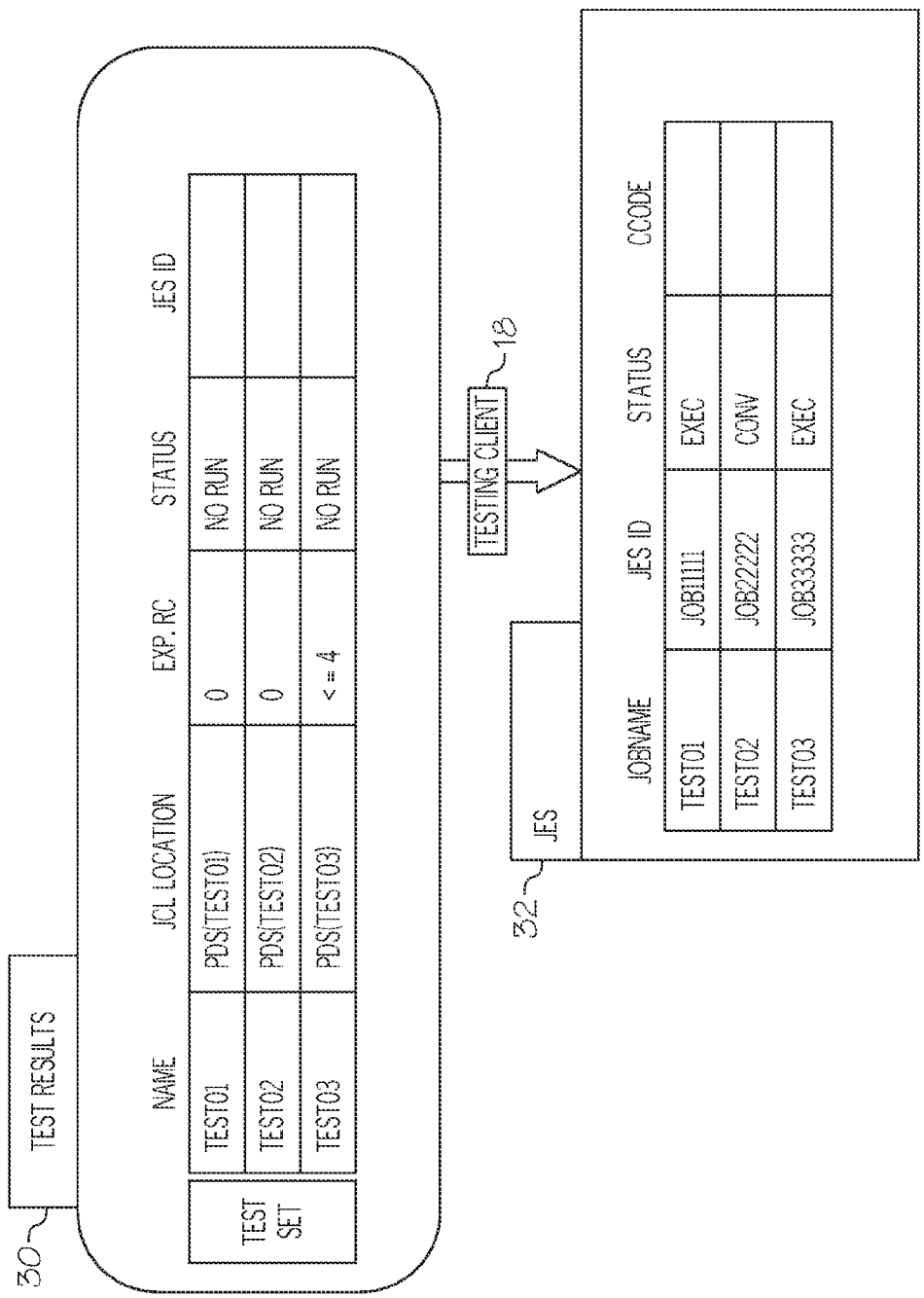
Figure 6:
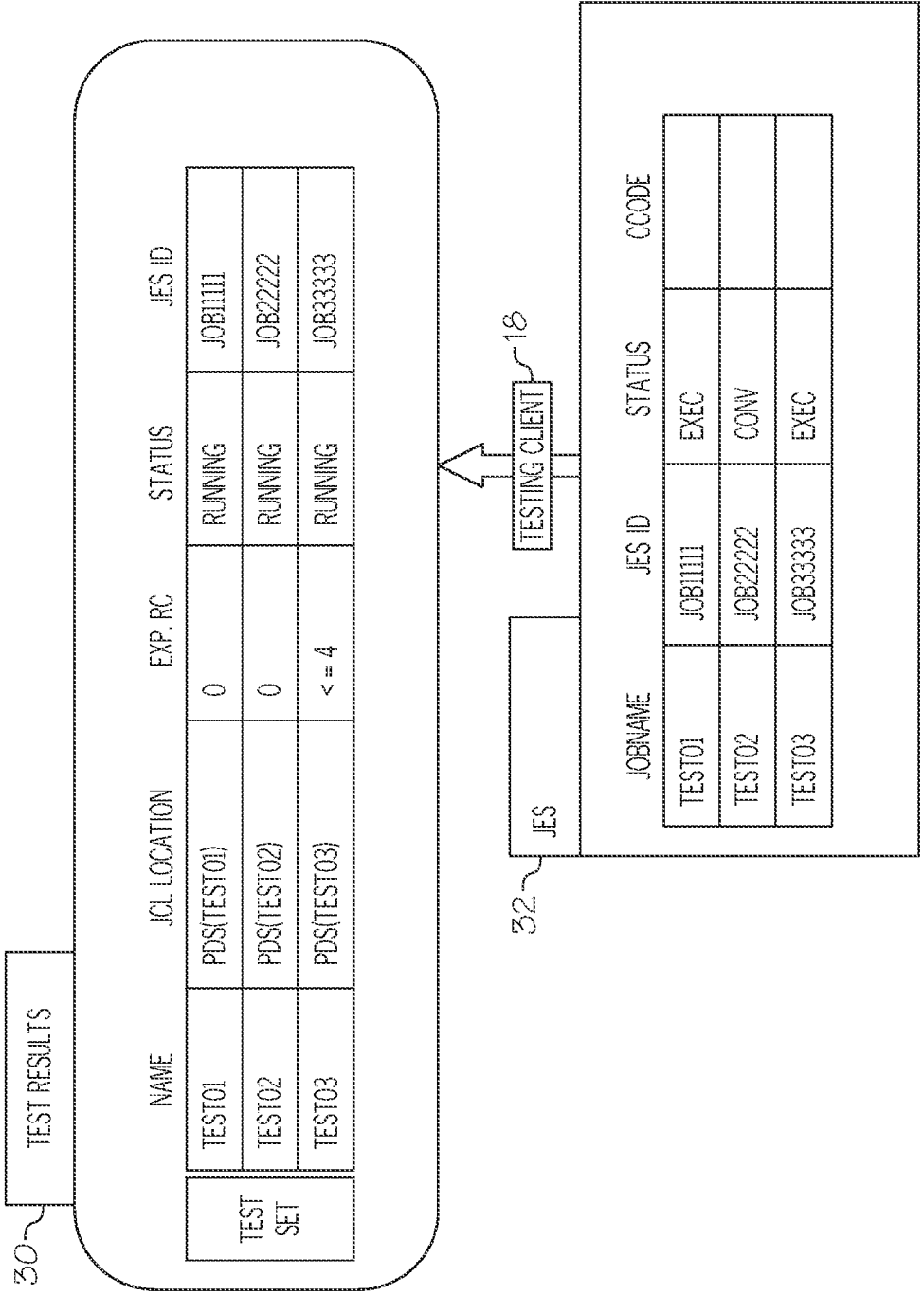

FIG. 5 illustrates an example of step 210 in which the JES spool 32 of the mainframe computing system 14 creates, for each JCL test, a JES execution ID (e.g., "JOB11111," "JOB22222," etc.), and a test status. In one or more embodiments the status "EXEC" indicates that a given JCL test is executing, "CONV" indicates that a given JCL test is scheduled for execution, and "OUTPUT" indicates that execution of a given JCL test is complete. FIG. 6 illustrates an example of steps 212-214 in which the testing client 18 obtains and transmits both the JES execution ID and an initial status for each JCL test to the primary database 24. In the example of FIG. 6, the initial status for each JCL test is "Running." In this regard, the testing client 18 is able to map the test status values in JES (e.g., EXEC, CONV, OUTPUT) to test status values recognized by QC/ALM.

In one or more embodiments, transmitting JCL test locations to the mainframe computing system 14 in step 206/block 104 includes transmitting one or more runtime parameters to be used by the mainframe computing system 14 in execution of one or more of the plurality of JCL tests. In one or more embodiments, the testing client 18 dynamically submits the parameters such that an original JCL parameter remains unchanged in the stored JCL test, but the dynamically transmitted value is used during execution.

Figure 7:
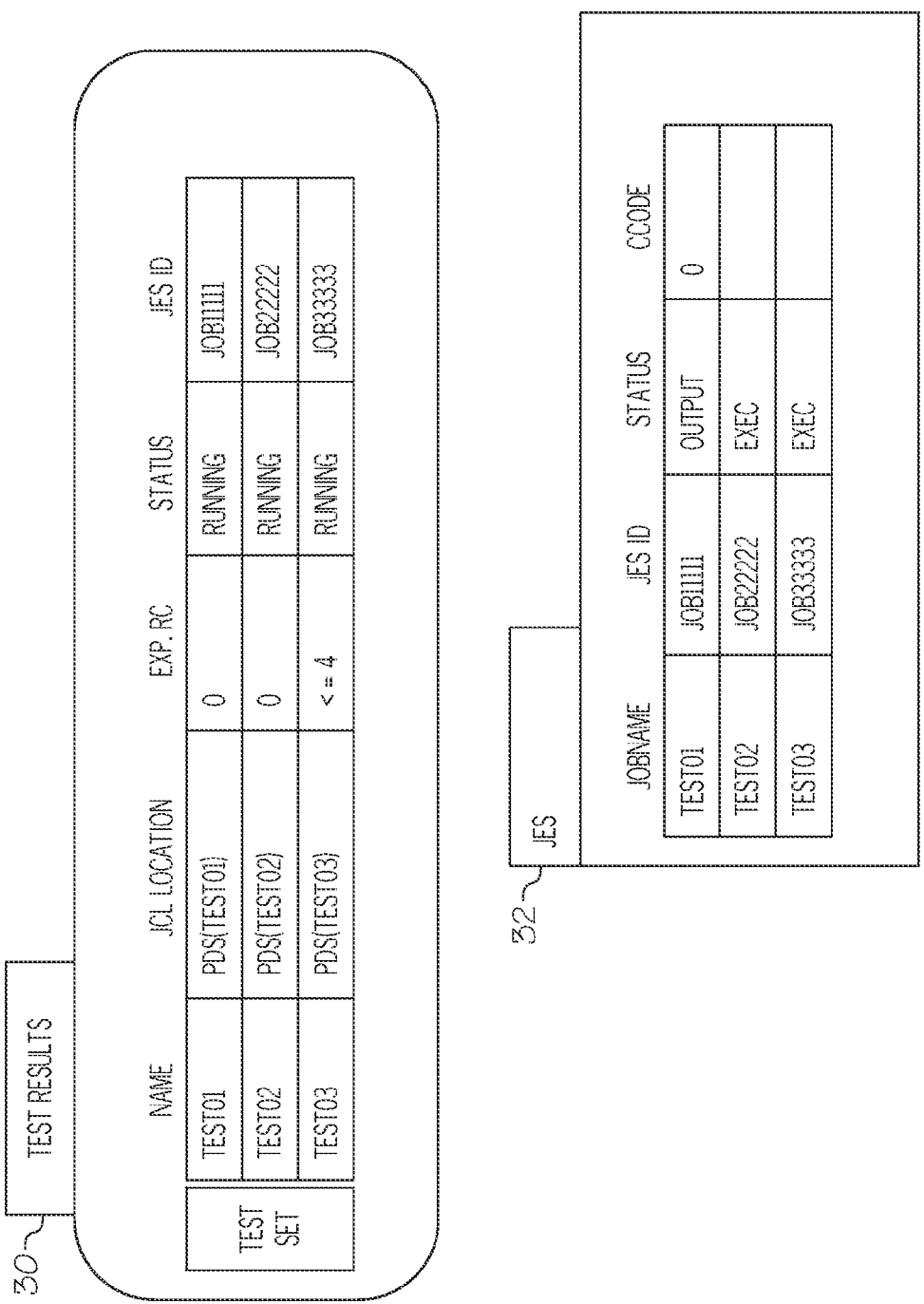
Figure 8:
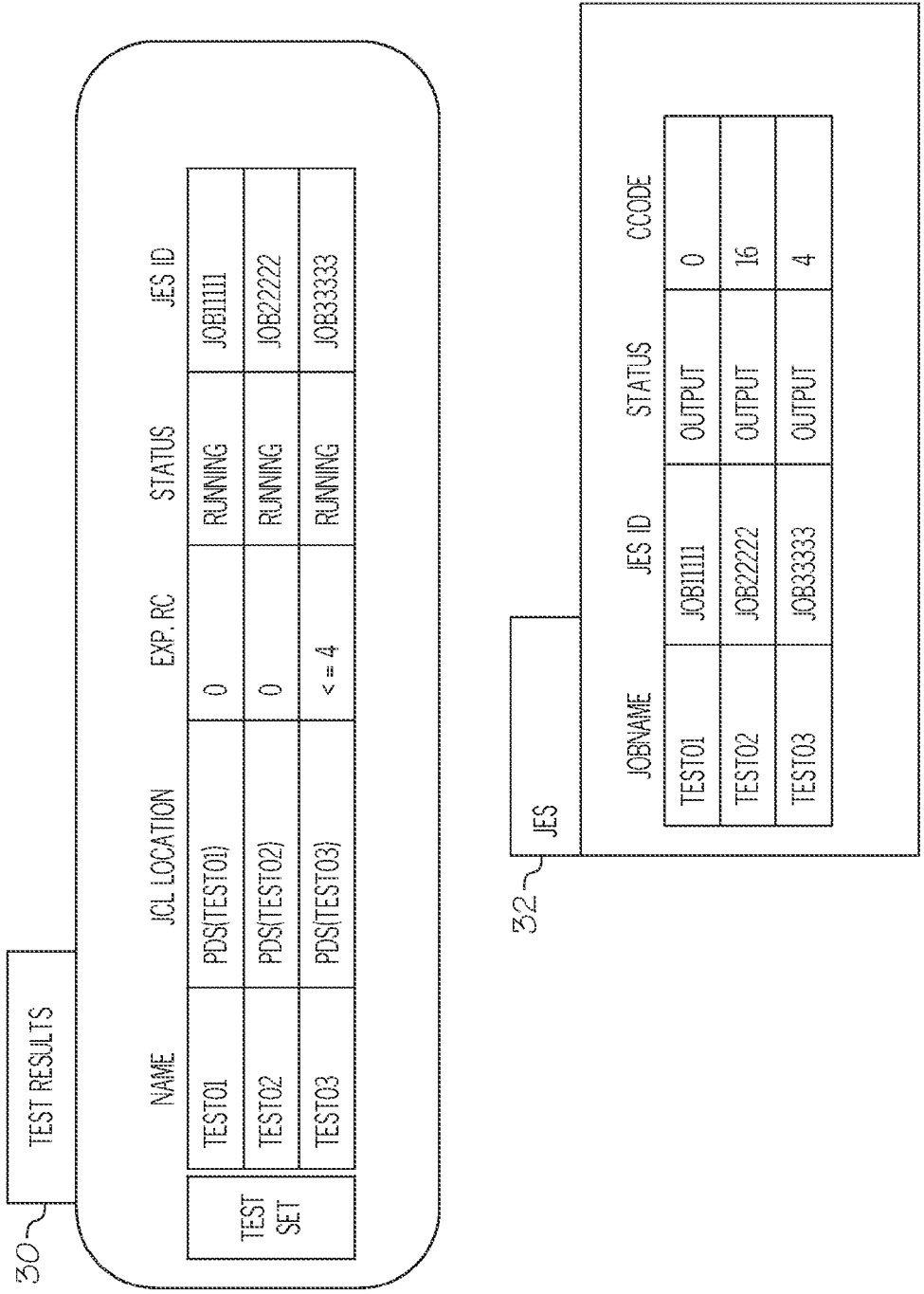

The testing client 18 waits for a predefined time period to elapse or for an update to be requested by a user (step 216). During this time, the JCL tests continue to execute in the mainframe computing system 14. FIGS. 7-8 illustrate continued execution of JCL tests in the mainframe computing system 14. In FIG. 7, the TEST01 JCL test completes and has a return code (also known as a "CCode" in JES) of "0." In FIG. 8, JCL tests TEST02 and TEST03 complete, their status changes to "OUTPUT," and their return codes are determined in the JES spool 32.

Upon the occurrence of either of the time period elapsing or an update being requested, the testing client 18 requests the JES execution IDs of JCL tests who have a "Running" status (i.e., those JCL tests who have not yet completed executing) (step 218), and a list of those execution IDs is received (step 220). In one or more embodiments, steps 218, 220 may be omitted if the testing client 18 knows that all JCL tests currently have a status of "Running" in the primary database 24 (e.g., in a first iteration of the method 200). The testing client 18 queries the mainframe computing system 14 for the completion status of the JCL tests having execution IDs obtained in step 220 (step 222), receives status updates from mainframe computing system 14 (step 224) and based on the received status updates, the testing client 18 updates the primary database (step 226).

Figure 9:
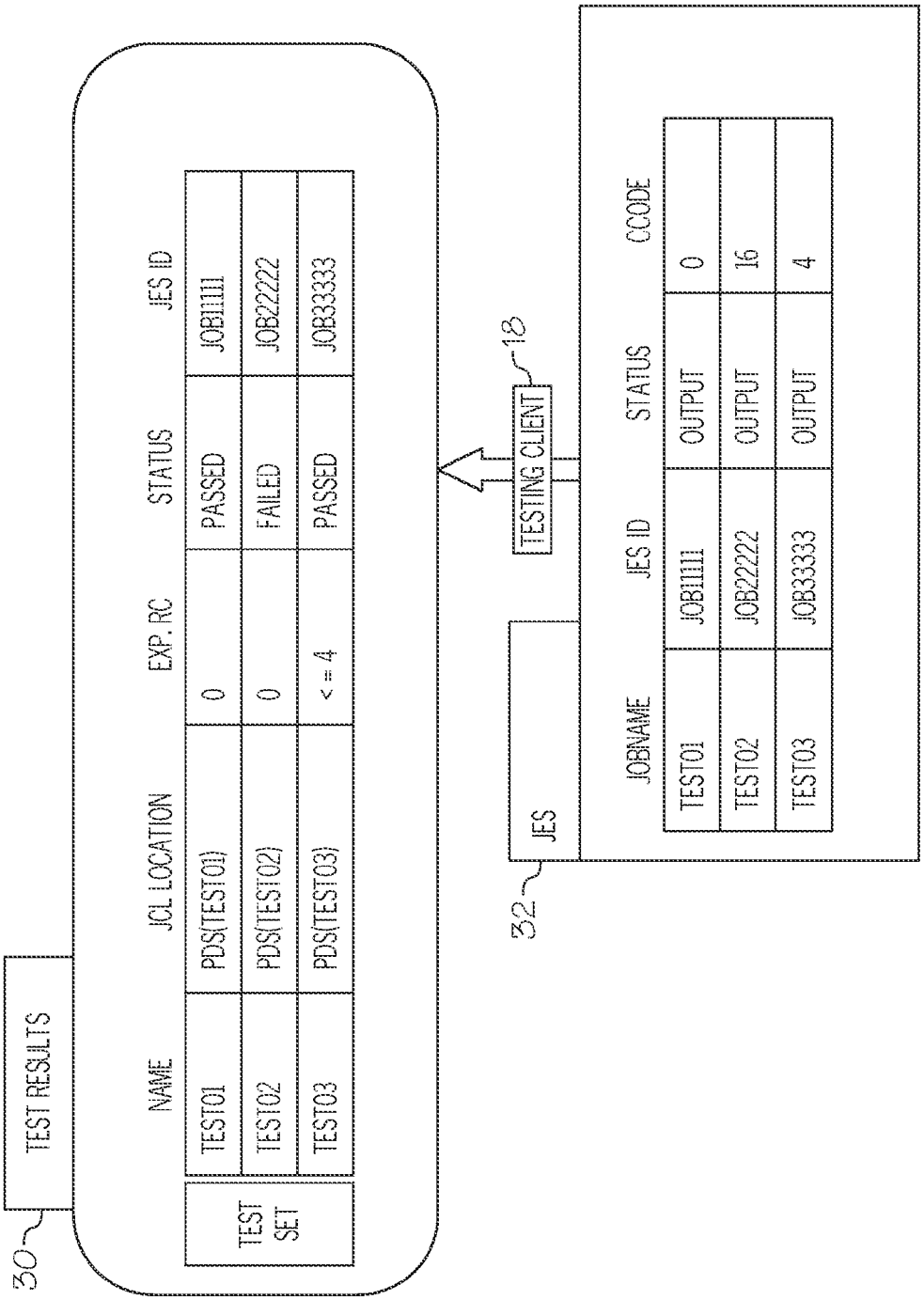

In one or more embodiments, step 226 involves the following: receiving the JES return code for a given JCL test as a "first return code" (e.g., value "4" for TEST03 from the JES spool 32), obtaining one or more expected return codes for the JCL test as "second return code(s)" (e.g., "<=4" for TEST03 from test results 30), and comparing the return codes. Based on the first return code matching one of the one or more second return codes, the testing client 18 updates initial status in the primary database 24 to indicate that the JCL test has succeeded. Based on the first return code not matching any of the one or more second return codes, the testing client 18 updates the initial status in the primary database 24 to indicate that the JCL test has failed. FIG. 9 illustrates an example performance of steps 224, 226.

As shown in FIG. 9, For JCL test TEST01 a return code of "0" is obtained, which matches the expected return code of "0." Therefore, the testing client 18 updates TEST01 to have a status of "Passed" in the primary database 24.

For JCL test TEST02 a return code of "16" is obtained, which does not match the expected return code of "0." Therefore, the testing client 18 updates TEST02 to have a status of "Failed" in the primary database 24.

For JCL test TEST03 a return code of "4" is obtained, which matches one of the expected return codes (as 4 is less than or equal to 4). Therefore, the testing client 18 updates TEST03 to have a status of "Passed" in the primary database 24.

If any JCL tests have not yet completed, then the testing client 18 repeats steps 216-226, and if necessary continues to repeat those steps in a loop, until all JCL tests in the set of JCL tests have been completed (step 228). The loop may be repeated periodically according to the predefined time period discussed in connection with step 216.

The transmission of the JCL tests to the mainframe computing system 14 and the execution of the JCL tests by the mainframe computing system 14 can be carried out in a number of ways. In one or more embodiments, all JCL tests selected in step 202 are transmitted to the mainframe computing system 14 at once and are executed as a batch. In one or more embodiments, the JCL tests are transmitted to the mainframe computing system either one by one, or in smaller groups. Thus, batch testing, or single JCL test execution could be utilized depending on user preference.

Figure 10:
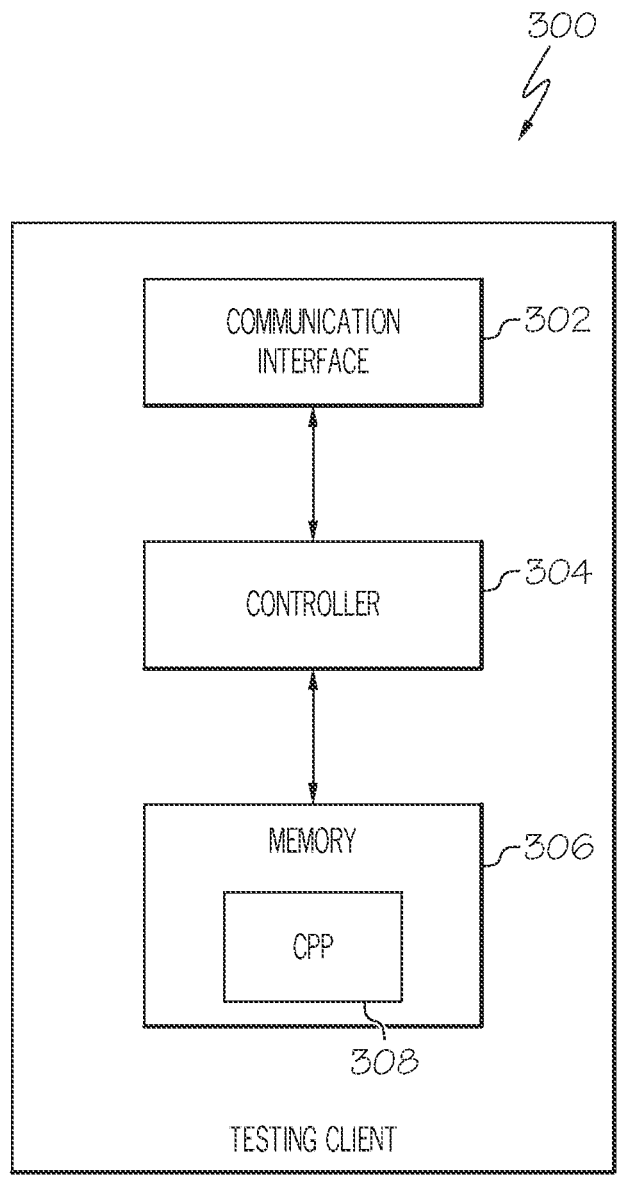
FIG. 10 illustrates an example computing device operative to execute the method of FIG. 2.

FIG. 10 illustrates an example computing device 300 configured as the testing client 18, and operative to implement one or more of the techniques discussed above. The computing device 300 includes a communication interface 302, a processor circuit 304, and a computer readable storage medium (shown as memory 306). The communication interface 302 is configured to send and receive data between the computing device 300 and the mainframe computing system 14, and between the computing device 300 and the primary database 24 that supports operation of software testing management platform 12. The controller 304 includes one or more processing circuits configured to obtain locations of a plurality of Job Control Language (JCL) tests from the primary database 24, and transmit the locations of the plurality of JCL tests to the mainframe computing system 14 to initiate execution of the plurality of JCL tests in the mainframe computing system 14.

Based on transmitting the JCL test locations, the controller 304 retrieves execution identifiers (IDs) for each of the plurality of JCL tests from the mainframe computing system 14, and for each JCL test, stores the execution ID and an initial status of the JCL test in the primary database 24. Subsequently, the controller 304 transmits a query to the mainframe computing system 14 to determine an execution status of a given one of the plurality of JCL tests, and based on transmitting the query, receives a status update from the mainframe computing system 14 for the given JCL test. Of course, as discussed above, this could be done for a plurality of JCL tests at a given time. Based on the status update, the controller 304 selectively updates the initial status of the JCL test in the primary database 24. In one or more embodiments, the testing client 306 stores a computer program product 308 in the memory 306, which when executed by the computing device 300, configures the computing device 300 as discussed above.

In one or more embodiments, the features discussed above are added to QC/ALM in the form of a QC/ALM plugin. Of course this is only an example, and the features discussed above could also be implemented as a standalone application outside of QC/ALM. Also, although QC/ALM has been discussed above, it is understood that the techniques described above could be applied to other software testing management platforms for which support of JCL testing is desired.

The JCL testing features discussed above offer a number of advantages over the prior art. By avoiding the manual and error prone process of manual JCL test execution and manually summarizing of test results, regression testing cycles can be reduced by considerable margins, as both test execution and test reporting can be automated. Additionally, by directly accessing and modifying the primary database 24, the testing client 18 can be implemented with a small footprint, and the use of external and/or intermediate databases can be avoided if desired.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
    obtaining locations of a plurality of Job Control Language (JCL) tests from a database of a software testing management platform, wherein the database is a primary database that supports operation of the software testing management platform;
    transmitting the locations of the plurality of JCL tests to a mainframe computing system to initiate execution of the plurality of JCL tests in the mainframe computing system;
    based on transmitting the JCL test locations, retrieving execution identifiers (IDs) for each of the plurality of JCL tests from the mainframe computing system;
    storing, in the primary database and for each JCL test, the execution ID and an initial status of the JCL test;
    subsequently transmitting a query to the mainframe computing system to determine an execution status of a given one of the plurality of JCL tests;
    based on transmitting the query, receiving a status update from the mainframe computing system for the given JCL test, wherein the status update includes a first return code for the given JCL test; and
    based on the status update, selectively updating the initial status of the given JCL test in the primary database, the selectively updating comprising:
        obtaining one or more second, expected return codes for the given JCL test from the primary database;
        comparing the first return code to the one or more second return codes;
        based on the first return code matching one of the one or more second return codes, updating the initial status in the primary database to indicate that the JCL test has succeeded; and
        based on the first return code not matching any of the one or more second return codes, updating the initial status in the primary database to indicate that the JCL test has failed.

2. The computer-implemented method of claim 1:
    wherein the locations of the plurality of JCL tests and the query are transmitted to a Job Entry Subsystem (JES) of the mainframe computing system; and
    wherein the execution IDs and the status update are retrieved from the JES.

3. The computer-implemented method of claim 1, further comprising if a status update received from the mainframe computing system based on an initial query does not include a return code for the given JCL test, periodically transmitting additional queries to the mainframe computing system until the status update is received which includes the first return code for the given JCL test.

4. The computer-implemented method of claim 1, wherein transmitting the locations of the plurality of JCL tests to the mainframe computing system comprises transmitting one or more runtime parameters to be used by the mainframe computing system in execution of one or more of the plurality of JCL tests.

5. The computer-implemented method of claim 1, wherein the software testing management platform does not natively support testing of JCL tests.

6. The computer-implemented method of claim 1, wherein each of the plurality of JCL tests is part of a test group within a larger test repository.

7. A computing device comprising:
    a communication interface configured to send and receive data between the computing device and a mainframe computing system, and between the computing device and a primary database that supports operation of a software testing management platform; and
    a processing circuit connected to a memory of the computing device, the processing circuit configured to:
        obtain locations of a plurality of Job Control Language (JCL) tests from the primary database;
        transmit the locations of the plurality of JCL tests to the mainframe computing system to initiate execution of the plurality of JCL tests in the mainframe computing system;
        based on transmitting the JCL test locations, retrieve execution identifiers (IDs) for each of the plurality of JCL tests from the mainframe computing system;
        store, in the primary database and for each JCL test, the execution ID and an initial status of the JCL test;
        subsequently transmit a query to the mainframe computing system to determine an execution status of a given one of the plurality of JCL tests;
        based on transmitting the query, receive a status update from the mainframe computing system for the given JCL test, wherein the status update includes a first return code for the given JCL test; and
        based on the status update, selectively update the initial status of the given JCL test in the primary database;
    wherein to selectively update the initial status of the JCL test in the primary database, the processing circuit is configured to:
        obtain one or more second, expected return codes for the given JCL test from the primary database;
        compare the first return code to the one or more second return codes;
        based on the first return code matching one of the one or more second return codes, update the initial status in the primary database to indicate that the JCL test has succeeded; and based on the first return code not matching any of the one or more second return codes, update the initial status in the primary database to indicate that the JCL test has failed.

8. The computing device of claim 7:
wherein the processing circuit is configured to transmit the locations of the plurality of JCL tests and the query to a Job Entry Subsystem (JES) of the mainframe computing system; and
wherein the processing circuit is configured to retrieve the execution IDs and the status update from the JES.

9. The computing device of claim 7, wherein the processing circuit is configured to, if a status update received from the mainframe computing system based on an initial query does not include a return code for the given JCL test, periodically transmit additional queries to the mainframe computing system until the status update is received which includes the first return code for the given JCL test.

10. The computing device of claim 7, wherein to transmit the locations of the plurality of JCL tests to the mainframe computing system, the processing circuit is configured to transmit one or more runtime parameters to be used by the mainframe computing system in execution of one or more of the plurality of JCL tests.

11. The computing device of claim 7, wherein the software testing management platform does not natively support testing of JCL tests.

12. The computing device of claim 7, wherein each of the plurality of JCL tests is part of a test group within a larger test repository.

13. A computer program product comprising:
a non-transitory computer readable storage medium having computer readable program code embodied therewith, the computer readable program code comprising:
computer readable program code configured to obtain locations of a plurality of Job Control Language (JCL) tests from a database of a software testing management platform, wherein the database is a primary database that supports operation of the software testing management platform;
computer readable program code configured to transmit the locations of the plurality of JCL tests to a mainframe computing system to initiate execution of the plurality of JCL tests in the mainframe computing system;
computer readable program code configured to, based on transmitting the JCL test locations, retrieve execution identifiers (IDs) for each of the plurality of JCL tests from the mainframe computing system;
computer readable program code configured to store, in the primary database and for each JCL test, the execution ID and an initial status of the JCL test;
computer readable program code configured to subsequently transmit a query to the mainframe computing system to determine an execution status of a given one of the plurality of JCL tests;
computer readable program code configured to, based on transmitting the query, receive a status update from the mainframe computing system for the given JCL test, wherein the status update includes a first return code for the given JCL test; and
computer readable program code configured to, based on the status update, selectively update the initial status of the given JCL test in the primary database by:
obtaining one or more second, expected return codes for the given JCL test from the primary database;
comparing the first return code to the one or more second return codes;
based on the first return code matching one of the one or more second return codes, updating the initial status in the primary database to indicate that the JCL test has succeeded; and
based on the first return code not matching any of the one or more second return codes, updating the initial status in the primary database to indicate that the JCL test has failed.

14. The computer program product of claim 13:
wherein the computer readable program code configured to transmit the locations of the plurality of JCL tests to the mainframe computing system is configured to transmit the locations to a Job Entry Subsystem (JES) of the mainframe computing system;
wherein the computer readable program code configured to retrieve the execution IDs for each of the plurality of JCL tests from the mainframe computing system is configured to retrieve the execution IDs and from the JES; and
wherein the computer readable program code configured to receive a status update for the given JCL test from the mainframe computing system is configured to receive the status update from the JES.

15. The computer program product of claim 13, further comprising computer readable program code configured to, if a status update received from the mainframe computing system based on an initial query does not include a return code for the given JCL test, periodically transmit additional queries to the mainframe computing system until the status update is received which includes the first return code for the given JCL test.

16. The computer program product of claim 13, wherein the computer readable program code configured to transmit the locations of the plurality of JCL tests to the mainframe computing system comprises computer readable program code configured to transmit one or more runtime parameters to be used by the mainframe computing system in execution of one or more of the plurality of JCL tests.

17. The computer program product of claim 13, wherein the software testing management platform does not natively support testing of JCL tests.

18. The computer program product of claim 13, wherein each of the plurality of JCL tests is part of a test group within a larger test repository.

* * * * *